United States Patent
Danielson et al.

(10) Patent No.: US 9,519,691 B1
(45) Date of Patent: Dec. 13, 2016

(54) METHODS OF TRACKING TECHNOLOGIES AND RELATED SYSTEMS AND COMPUTER PROGRAM PRODUCTS

(71) Applicant: CA, Inc., Islandia, NY (US)

(72) Inventors: Debra J. Danielson, Skillman, NJ (US); Steven L. Greenspan, Scotch Plains, NJ (US)

(73) Assignee: CA, Inc., New York, NY (US)

( * ) Notice: Subject to any disclaimer, the term of this patent is extended or adjusted under 35 U.S.C. 154(b) by 226 days.

(21) Appl. No.: 13/954,566

(22) Filed: Jul. 30, 2013

(51) Int. Cl.
*G06F 17/21* (2006.01)
*G06F 17/30* (2006.01)

(52) U.S. Cl.
CPC .............................. *G06F 17/30539* (2013.01)

(58) Field of Classification Search
CPC .... G06F 17/30; G06F 17/60; G06F 17/30705; G06F 17/278
See application file for complete search history.

(56) References Cited

U.S. PATENT DOCUMENTS

| | | | |
|---|---|---|---|
| 6,442,545 B1 * | 8/2002 | Feldman et al. | |
| 6,886,007 B2 * | 4/2005 | Leymann | G06Q 10/10 |
| 7,243,802 B2 * | 7/2007 | Albertson | 210/519 |
| 7,558,778 B2 * | 7/2009 | Carus et al. | |
| 8,341,170 B2 * | 12/2012 | Jung et al. | 707/758 |
| 2004/0098271 A1 | 5/2004 | Hicks et al. | |
| 2006/0242190 A1 * | 10/2006 | Wnek | G06F 17/30734 |
| 2008/0288309 A1 * | 11/2008 | Nasukawa et al. | 705/7 |
| 2012/0239694 A1 | 9/2012 | Avner et al. | |
| 2013/0144875 A1 * | 6/2013 | Hagiwara | 707/731 |

* cited by examiner

*Primary Examiner* — Robert Beausoliel, Jr.
*Assistant Examiner* — Arthur Ganger
(74) *Attorney, Agent, or Firm* — Myers Bigel, P.A.

(57) ABSTRACT

A method of tracking technologies may include providing a taxonomy wherein the taxonomy includes a plurality of technology/capability terms, and searching a data source using the technology/capability terms from the taxonomy. A plurality of text segments may be retrieved from the data source, with each of the text segments including at least one of the technology/capability terms from the taxonomy. A plurality of new technology/capability terms may be identified from the plurality of text segments retrieved from the data source, and a respective use frequency may be determined for each of the new technology/capability terms. Responsive to a respective use frequency of one of the new technology/capability terms being greater than a use frequency threshold, the taxonomy may be updated to include the new technology/capability term having the respective use frequency that is greater than the use frequency threshold.

22 Claims, 5 Drawing Sheets

Figure 3

| Taxonomy Storage 109d ||
|---|---|
| Technology Terms | Capability Terms |
| Software Application - 1 | Capability-A<br>Capability-B |
| Software Application - 2 | Capability-C<br>Capability-D<br>Capability-E |
| Software Application - 3 | Capability-F |
| Software Application - 4 | Capability-A<br>Capability-F |

Figure 4

| Taxonomy ||
| --- | --- |
| Technology Terms | Capability Terms |
| Software Application - 1 | Capability-A<br>Capability-B |
| Software Application - 2 | Capability-C<br>Capability-D<br>Capability-E |
| Software Application - 3 | Capability-F<br>*Capability-G* |
| Software Application - 4 | *Capability-A*<br>*Capability-F*<br>*Capability-H* |
| *Software Application - 5* | Capability-A |

Figure 5

| Fringe List Of Technology Terms |
| --- |
| *Software Application – 6*<br>*Software Application – 7* |

Figure 6

| Taxonomy | |
|---|---|
| Technology Terms | Capability Terms |
| Software Application - 1 | Capability-A<br>Capability-B<br>*Capability-X* |
| Software Application - 2 | Capability-C<br>Capability-D<br>Capability-E |
| Software Application - 3 | Capability-F<br>Capability-G |
| Software Application - 4 | Capability-A<br>Capability-F<br>Capability-H |
| Software Application - 5 | Capability-A |
| *Software Application - 6* | Capability-C |

Figure 7

| Fringe List Of Technology Terms |
|---|
| Software Application – 7 |

METHODS OF TRACKING TECHNOLOGIES AND RELATED SYSTEMS AND COMPUTER PROGRAM PRODUCTS

BACKGROUND

The present disclosure relates to automated tracking systems and related methods.

Methods to track lifecycles of technology items are discussed, for example, in U.S. Patent Publication No. 2004/0098271 to Hicks et al., the disclosure of which is hereby incorporated herein in its entirety by reference. In Hicks et al., a computerized method is used by a company to track lifecycles of technology items. More particularly, an identification of a technology item to track is received and information is received from a plurality of sources regarding a plurality of characteristics of a lifecycle of the identified technology item in response to a query of the sources. The plurality of characteristics include a location within one of a plurality of segments of the lifecycle, a speed of movement of the technology item within its lifecycle, a disruptiveness of the technology item in the marketplace, and an engagement of technology item by the company. The computerized method of Hicks et al. further includes processing the received information and generating an output, in which the output includes a plurality of indicators representing the plurality of characteristics of the lifecycle.

Notwithstanding methods/systems of Hicks et al., there continues to exist a need to provide improved methods of tracking technologies.

BRIEF SUMMARY

One aspect of the present disclosure is directed to methods by a technology tracking system to track technologies. The method includes providing a taxonomy in electronic memory wherein the taxonomy includes a plurality of technology and/or capability terms, searching a data source using the technology and/or capability terms from the taxonomy in electronic memory, and retrieving a plurality of text segments from the data source with each of the text segments including at least one of the technology and/or capability terms from the taxonomy in electronic memory. The method identifies a plurality of new technology and/or capability terms from the plurality of text segments retrieved from the data source, and determines a respective use frequency for each of the new technology and/or capability terms. Responsive to a respective use frequency of one of the new technology and/or capability terms being greater than a use frequency threshold, the taxonomy in electronic memory is updated to include the new technology and/or capability term having the respective use frequency that is greater than the use frequency threshold.

The data source may be a first data source, and determining the respective use frequency for each of the new technology and/or capability terms may include searching a second data source (different than the first data source) for a number of instances of each of the new technology and/or capability terms.

Responsive to a respective use frequency of one of the new technology and/or capability terms being less than the use frequency threshold, the method may further update a fringe list in electronic memory to include the new technology and/or capability term having the respective use frequency that is less than the use frequency threshold.

The plurality of text segments may be a first plurality of text segments, and the plurality of new technology and/or capability terms may be a first plurality of new technology and/or capability terms. The method may further search the data source using the technology and/or capability terms from the taxonomy in electronic memory after updating the taxonomy in electronic memory, retrieve a second plurality of text segments from a data source with each of the text segments of the second plurality including at least one of the technology and/or capability terms from the taxonomy in electronic memory, and identify a second plurality of new technology and/or capability terms from the second plurality of text segments retrieved from the data source. In addition, the method may determine a respective use frequency for each of the new technology and/or capability terms of the second plurality of new technology and/or capability terms and/or from the fringe list, and responsive to one of the new technology and/or capability terms from the second plurality and/or from the fringe list exceeding the use frequency threshold, the method may update the taxonomy in electronic memory to include the new technology and/or capability term exceeding the use frequency threshold.

The data source may include the world wide web and/or a portion thereof.

For each of the text segments, the method may retrieve the text segment by retrieving the text segment including a plurality of words before and/or after the respective technology and/or capability term.

For each of the text segments, the method may retrieve the text segment by retrieving a sentence including the respective technology term and/or capability term.

The taxonomy may include a plurality of technology terms and a plurality of capability terms.

The plurality of technology terms may include a plurality of application names, such as software application names. Moreover, at least one of the capability terms is associated with each of the technology terms, and/or each of the capability terms is associated with at least one of the technology terms.

Another related aspect of the present disclosure is directed to a technology tracking system that includes a network interface providing coupling over a network, a processor coupled to the network interface, and a memory coupled to the processor. The memory provides a taxonomy including a plurality of technology and/or capability terms. In addition, the memory includes computer readable program code that when executed by the processor causes the processor to perform operations to search a data source using the technology and/or capability terms from the taxonomy in the memory, and retrieve a plurality of text segments from the data source with each of the text segments including at least one of the technology and/or capability terms from the taxonomy in the memory. The memory also includes computer readable program code that when executed by the processor causes the processor to identify a plurality of new technology and/or capability terms from the plurality of text segments retrieved from the data source, determine a respective use frequency for each of the new technology and/or capability terms, and update the taxonomy in the memory to include the new technology and/or capability term having a respective use frequency that is greater than the use frequency threshold responsive to the respective use frequency of one of the new technology and/or capability terms being greater than a use frequency threshold.

Related computer program products are also disclosed. It is noted that aspects described herein with respect to one embodiment may be incorporated in different embodiments although not specifically described relative thereto. That is, all embodiments and/or features of any embodiment can be combined in any way and/or combination. Moreover, other systems, methods, and/or computer program products according to embodiments herein will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

Aspects of the present disclosure are illustrated by way of example and are not limited by the accompanying figures, in which like references indicate like elements.

FIGS. 3-7 are diagrams illustrating Taxonomies and Fringe Lists according to some embodiments.

DETAILED DESCRIPTION

Figure 1:
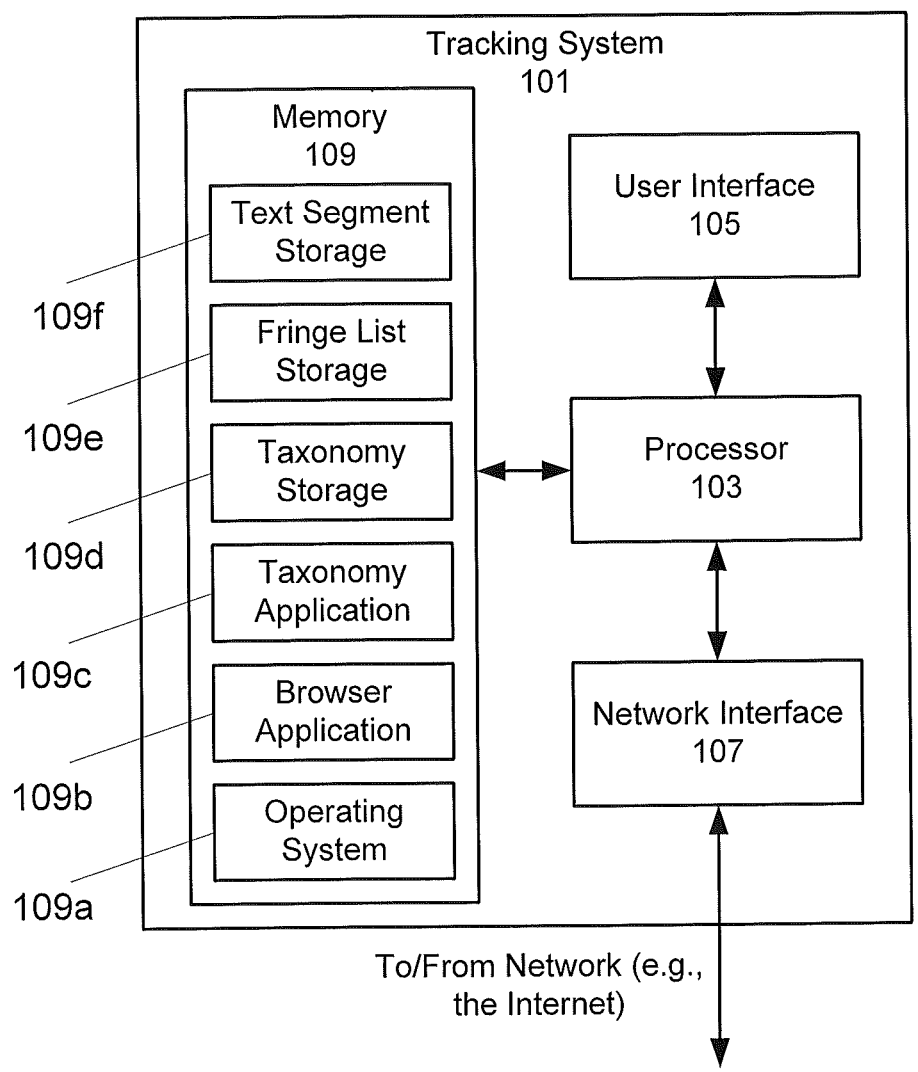
FIG. 1 is a block diagram illustrating tracking systems according to some embodiments of inventive concepts.

Embodiments of the present disclosure will be described more fully hereinafter with reference to the accompanying drawings. Other embodiments may take many different forms and should not be construed as limited to the embodiments set forth herein. Like numbers refer to like elements throughout.

Increasingly, the number and pace of emerging technologies and services is/are outpacing the ability of service consumers to identify (and subsequently assess) more efficient alternatives to existing services, or net new services. As CIOs (Corporate Information Officers) become more and more enablers of service consumption (rather than as service providers) it may becomes a function of the CIO role to identify alternatives to provide to the business.

This is a capability that is currently sourced through internal IT (Information Technology) analysts with the help of industry analysts, technology use outlets and consultants. This capability may not scale to potentially hundreds of aggregated services in consumption, and as many of these services will be consumed via SaaS (Software as a Service), IaaS (Infrastructure as a Service), PaaS (Platform as a Service), etc., there may be fewer compelling events for reassessment of services in use, and therefore review of the ROI (Return On Investment) may be driven by the business (CIO as proxy) proactively. As used herein, the term software application may be a SaaS software application, an IaaS software application, and/or a PaaS software application.

A cycle between providers (as identified through semantic search of the World Wide Web based on a seed taxonomy) and the technology they provide (as identified through semantic search of the web based on the providers identified in the prior cycle) may provide a means to develop a dynamic picture of an emerging technology taxonomy and landscape for a domain space.

According to some embodiments disclosed herein, an initial taxonomy of technology terms and related capabilities may be used as a starting point to dynamically track technologies and/or capabilities. The initial taxonomy, for example, may include a list of applications (software application names) and associated capabilities used within a business enterprise. The initial taxonomy is then used to search a larger data source (e.g., the world wide web) for the technology terms in the context of the related capabilities, and to retrieve text segments matching the terms/capabilities of the initial taxonomy. Each matching text segment (also referred to as a paragraph), for example, may include a predetermined number of words surrounding the technology term from the taxonomy, or a grammatical structure containing the technology terms, such as a sentence.

The contextual information is, also, then used to update the taxonomy. For example, the contextual information may be used to: add new capabilities to existing technology terms of the taxonomy; to add new technology terms having capabilities of original technology terms; etc. Moreover, the revised taxonomy is used to search the large data source as discussed above to further update the taxonomy, and the taxonomy may thus be dynamically updated by periodically/continuously searching the large data source and updating the taxonomy. In this way, for example, a technology term (e.g., a software application name) may be used to discover new capabilities, and a given capability or underlying technology term of a known technology term (e.g., a software application name) may be used to discover new software applications that use or plan to use/provide that capability or technology.

Thus, in any one cycle, each of the matching text segments is analyzed to derive contextual information about the respective technology term and/or capability of that text segment. Contextual information may include authorship, key phrases across different text segments for the same term/capability, new terms across different text segments for the same term/capability, sentiment analysis (positive/negative, past/future, confidence, etc.), etc. Notably new technology terms may be identified in the text segment containing the original technology terms. To confirm their significance as a technology term for subsequent searches, the new terms are searched for in a second smaller data source, such as a predefined set of documents or websites (e.g., Gartner reports, well-respected blogs, etc.). For example, the second smaller data source may be a subset of the first large data source. If these new terms are found in the predefined set with a use frequency exceeding a defined use threshold, then the new term is added to the set of technology terms and used in subsequent searches. If a new technology term is not found or found in sufficient quantity (i.e., a new technology term is found in the predefined set with a use frequency that is less than the defined use threshold), then the new term is added to a fringe list of technology terms. The list of technology terms and the fringe list of technology terms can be further pruned by additional word and/or phrase filters automatically and/or manually.

The dynamic taxonomy and contextual information can then be used to create hype cycle influence maps, to map companies as being mainstream or innovators, to validate technologies/applications as developing/maturing/declining, etc., by examining the textual context (i.e., the text segment, and its meta-data: author, creation date, organizational affiliation, publisher, citations in other documents, etc.) for sentiment terms, tense (past, present, future), and other grammatical constructs and semantic associations.

Furthermore, methods and/or systems disclosed herein may allow notifications to be sent if pre-defined technology terms are used in certain contexts and/or with a certain frequency, and/or if there is a significant shift in the trend of a technology term.

An initial taxonomy of technology terms and related capabilities may thus be used to search the world wide web (also referred to as the "web"), with the search results being used to modify and/or update the taxonomy. The taxonomy may thus be iteratively modified/updated to provide a dynamic taxonomy that automatically evolves over time.

FIG. 1 is a block diagram illustrating a tracking system 101 according to some embodiments of inventive concepts. As shown, tracking system 101 may include processor 103 coupled to user interface 105, network interface 107, and electronic memory 109. Processor 103 may include one or more instruction execution circuits, such as a general purpose processor and/or special purpose processor (e.g., microprocessor and/or digital signal processor) that may be collocated (e.g., within a same circuit package, connected to a same backplane, enclosed within a same computer housing, etc.) or distributed across one or more data networks. Processor 103 may be configured to execute computer readable program code of operating system 109a and/or of functional applications (e.g., browser application 109b, taxonomy application 109c, etc.) residing in electronic memory 109 (also referred to as memory 109), described below as a computer readable storage medium, that causes the processor 103 to perform at least some of the operations and/or methods described herein as being performed by the tracking system 101 in accordance with one or more embodiments disclosed herein.

User interface 105 may support acceptance of input from a human user, for example, using a keyboard, keypad, mouse, trackball, joystick, touch sensitive display/screen, microphone, etc., and/or user interface 105 may support providing user output, for example, using a display/screen, printer, speaker, etc. User interface 105 may include a respective one or more of the input and/or output devices (e.g., keyboard, touch sensitive display/screen, display/screen, printer, speaker, etc.) internal to user interface 105 and tracking system 101, and/or user interface 105 may include a coupling(s)/port(s) for a respective one or more of the input and/or output devices (e.g., keyboard, touch sensitive display/screen, display/screen, printer, speaker, etc.) that is external to the user interface 105 and/or tracking system 101. Network interface 107 may provide coupling over one or more networks (e.g., the public Internet, a private local area network, a private wide area network, etc.) with a data source (e.g., the World Wide Web).

Electronic memory 109 may include an operating system 109a and one or more software applications (e.g., browser application 109b, taxonomy application 109c, etc.) including computer readable program code that may be executed by processor 101 to execute operations of the respective applications. More particularly, processor 101 may execute code of browser application 109b to access/search a data source (e.g., the World Wide Web) over a network or networks (e.g., the Internet), and processor 101 may execute code of taxonomy application 109c to track emerging technologies and/or capabilities as discussed in greater detail below. While browser and taxonomy applications are shown separately, functionality of a browser application may be integrated in taxonomy application 109c. In addition, memory 109 may include data storage such as taxonomy storage 109d, fringe list storage 109e, and/or text segment storage 109f. Taxonomy storage 109d may be used to save a taxonomy of technology terms and capability terms, fringe list storage 109e may be used to store new technology and/or capability terms that to not meet a use frequency threshold, and text segment storage may be used to store text segments relating to the technology/capability terms. While a single memory structure is illustrated by way of example in FIG. 1, elements of memory 109 may be distributed across different memory types/devices that are collocated with processor 103 and/or that are distributed across one or more data networks. One or more of taxonomy storage 109d, fringe list storage 109e, and/or text segment storage 109f, for example, may be provided using one or more database structures that are remote from processor 103.

Figure 2:
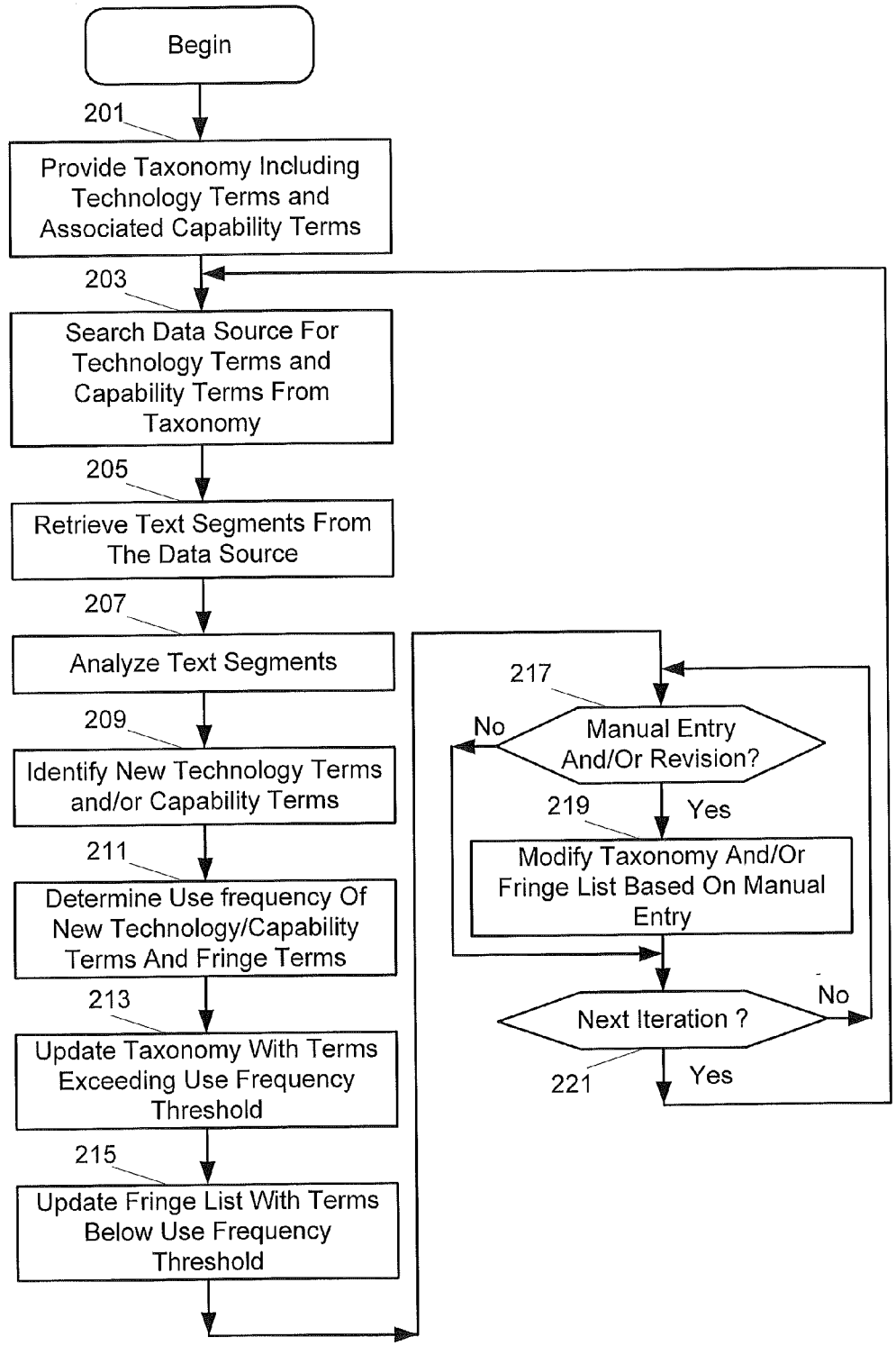
FIG. 2 is a flow chart illustrating operations of tracking systems according to some embodiments of inventive concepts.

FIG. 2 is a flow chart illustrating operations of tracking system 101 according to some embodiments. At block 201, an taxonomy of technology terms and associated capability terms may be provided in taxonomy storage 109d of electronic memory 109. As shown in FIG. 3, the taxonomy may be a table including a list of technology terms (which may be software application names) and associated capability terms. For example, each technology term may be a software application name, and one or more capability terms may be provided for at least some of the technology terms so that a capability term identifies a capability of a respective software application. As shown, some capability terms may be unique to a single technology term while other capability terms may apply to multiple technology terms.

The initial taxonomy, for example, may be developed manually based on input through user interface 105. Corporate staff, for example, may manually enter technology terms identifying software applications currently used and/or known by the business entity (e.g., Software Application 1, Software Application 2, Software Application 3, and Software Application 4), and known capabilities of these software applications (e.g., Capability-A, Capability-B, Capability-C, Capability-D, Capability-E, and Capability-F). As shown, some capabilities may be unique to one technology term (e.g., software application), and some capabilities may be shared by different technology terms (e.g., software application). Of the technology terms identified in the initial taxonomy of FIG. 3, for example: Capability-B may be unique to Software Application 1; Capability-C, Capability-D, and Capability-E may be unique to Software Application 2; Capability-A may be shared by Software Applications 1 and 4; and Capability-F may be shared by Software Applications 3 and 4.

Moreover, the initial taxonomy of FIG. 3 may be incomplete. For example, some technology terms (e.g., software applications) may be omitted from the initial taxonomy, or the business entity may initiate use of new technology terms during/after creation of the initial taxonomy. Moreover, capabilities identified for one or more of the technology terms (e.g., software applications) may be incomplete or omitted entirely, or later versions of the same software application may add new capabilities that were not know when the initial taxonomy was created.

Once the initial taxonomy is provided (e.g., manually created based on user input through user interface 105) at block 201 as discussed above with respect to FIG. 3, processor 103 may automatically update/revise the taxonomy according to taxonomy application 109c without user intervention. At block 203 of FIG. 2, processor 103 may search a first data source using the technology and/or capability terms from the taxonomy in taxonomy storage 109d of electronic memory 109 to identify text segments including the technology and/or capability terms of the taxonomy. Moreover, the first data source may include the world wide web, for example, including documents such as web pages, blogs, reports, articles, white papers, search engines (such as Google®), social media (e.g., Facebook®, Twitter®, etc.), and other sources of text information accessible over the Internet. More particularly, processor 103 executing taxonomy application 109c may use a browser application (e.g., either a separate browser application 109b or a browser application integrated in taxonomy application 109c) and network interface 107 to search (e.g., crawl) the first data source (e.g., the World Wide Web) over a network (e.g., the Internet) for text segments including the technology terms of the initial taxonomy in the context of the respective capability terms of the initial taxonomy.

At block 205, processor 103 may retrieve a plurality of text segments from the data source, with each of the text segments includes at least one of the technology and/or capability terms from the taxonomy in electronic memory. For each of the text segments, retrieving the text segment may include retrieving the text segment including a plurality of words before and/or after the respective technology and/or capability term. For example, each text segment may include a defined number of words before and/or after the technology/capability term; or the text segment may include a sentence including the technology/capability term; or the text segment may include the sentence including the technology/capability term and a defined number of sentences before and/or after a sentence including the technology/capability term).

According to some embodiment, the retrieved text segments may be saved in text segment storage 109f for later analysis/reanalysis, and/or the retrieved text segments may be analyzed on receipt. At block 207, processor 103 may analyze the retrieved text segments, for example, using the technology/capability terms from the taxonomy and/or contextual information from the text segments. Contextual information may include authorship, key phrases across different text segments for the same technology/capability term, new terms across different text segments for the same technology/capability term, sentiment analysis (e.g., positive/negative, past/future, confidence, etc.), etc. For example, new technology terms may be identified in texts segment containing the technology/capability terms from the previous version of the taxonomy. Using the text segment analysis of block 207, processor 103 may identify a plurality of new technology and/or capability terms (not included in the previous version of the taxonomy) from the plurality of text segments retrieved from the data source at block 209. For example, the initial taxonomy of technology terms and capability terms of FIG. 3 may be used to identify new Software Product 5, new Software Product 6, new Software Product 7, new Capability-G, and new Capability-H.

At block 211, processor 103 may determine a respective use frequency for each of the new technology and/or capability terms. More particularly, processor 103 may search a second data source (different than the first data source) using a browser application (either separate from or integrated in taxonomy application 109c), network interface 107, and a network (e.g., the Internet) for each of the new technology and/or capability terms identified at block 209 to determine a number of instances (i.e., the use frequency) of each of the new technology and/or capability terms in the second data source. By way of example, the first data source may include the World Wide Web, and the second data source may include a subset of the first data source, or the first and second data sources may be mutually exclusive. The use frequency may thus be used to determine a significance of each new technology and/or capability term before adding to the taxonomy. The use frequencies may be determined, for example, by searching in a predefined set of documents and/or websites (e.g., including Gartner reports, well-respected blogs, etc.) Accordingly, the second data source used to determine use frequencies may be much smaller than the first data source used to identify new technology and/or capability terms. By way of example, new Software Application 5 may have a use frequency exceeding a use frequency threshold, and new Software Applications 6 and 7 may have use frequencies that are less than the use frequency threshold.

At block 213, processor 103 may update the taxonomy in taxonomy storage 109d to include any of the new technology and/or capability terms having a respective use frequency that is greater than a use frequency threshold (e.g., Software Application 5). As shown for example in FIG. 4, existing technology terms (e.g., software application names) in the taxonomy may thus be used to identify new capabilities (e.g., new software capabilities) that may be added to the taxonomy, and/or existing capability terms (e.g., software capabilities) in the taxonomy may thus be used to identify new technology terms (e.g., software application names) that may be added to the taxonomy. By way of example, the initial taxonomy of FIG. 3 may be modified to add the new technology term Software Application 5 of FIG. 4, new Capability-G may be added for Software Application 3, new Capability-H may be added for Software Application 4, and known Capability-A may be provided for new Software Application 5.

At block 215, processor 103 may initiate/update a fringe list in fringe list storage 109e to include any of the new technology and/or capability terms having a respective use frequency that is less than the use frequency threshold. As shown in FIG. 5 by way of example, the fringe list of technology terms may be updated/initiated to include Software Applications 6 and 7 having use frequencies that are less than the use frequency threshold.

Operations of blocks 203, 205, 207, 209, 211, 213, and 215 may thus be performed automatically by processor 103 without user intervention to search a first data source to identify new technology and/or capability terms, to search a second data source (smaller than the first data source) to determine a significance of any new technology and/technology terms (e.g., by determining use frequencies), and to update the taxonomy to include new technology and/or capability terms having sufficient significance. Moreover, new technology and/or capability terms of lower significance may be preserved in the fringe list for future searches without adding such terms to the actual taxonomy.

At block 271, processor 103 may determine if manual entry to and/or revision of the current taxonomy and/or fringe list is requested by user input through user interface 105. If such manual entry/revision is requested, processor 103 may modify the taxonomy and/or fringe list based on such input at block 219. The business entity, for example, may have initiated use of a new software application so that addition of the new software application to the taxonomy is desired, or the business entity may have discontinued use of a software application so that removal of the software application from the taxonomy is appropriate. A user may also review the fringe list and add/delete terms based on such review.

At block 221, processor may initiate a new iteration of automated searches/updates. New iterations may be initiated periodically and programmed times/intervals, and/or new iterations may be initiated responsive to user input. In subsequent iterations of blocks 203, 205, 207, 209, 211, 213, and 215, processor 103 may perform these operations as discussed above with respect to the initial iteration with the exception that technology terms from the fringe list may be reconsidered for addition to the taxonomy at blocks 211 and 213. In the time between addition of a technology term to the fringe list and a subsequent iteration, its use frequency may have increased above the use frequency threshold (e.g., due to increased mentions in the second data source). As shown in FIGS. 6 and 7, for example, a second iteration may result in identification new Capability-X for Software Product 1. In addition, a recalculation of use frequencies of technology terms of the fringe list at block 211 may result in Software Product 6 having a use frequency that is now greater than the use frequency threshold and Software Product 7 having a use frequency that is still less than the use frequency threshold. Accordingly, the taxonomy may be updated at block 213 of the second iteration to add new Capability-X for Software Product 1 and to add Software Product 6 with Capability-C as shown in FIG. 6, while Software Product 6 is removed from the fringe list at block 215 as shown in FIG. 7.

Moreover, the fringe list may be pruned automatically and/or manually. For example, if a technology term is on the fringe list for a predetermined number of iterations of taxonomy/fringe list updates with a use frequency that never exceeds the use frequency threshold (or a lower threshold), the technology term may be automatically removed from the fringe list.

The resulting taxonomy and/or related contextual information can then be used to create hype cycles and/or influence maps, to map companies as being mainstream or innovative, to validate technologies/products as developing/maturing/declining, etc. By examining textual context (i.e., the text segment, and its meta-data, authorship, creation date, organizational affiliation, publisher, citations in other documents, etc.) for sentiment terms, tense (past, present, future) and other constructs and semantic associations. Moreover, process 103 may provide notifications if predefined technology terms are used in certain contexts or with a certain frequency, or if there is a significant shift in a trend.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, in entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a buffered repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable storage medium that when executed can direct a computer, other programmable data processing apparatus, or other devices to function in a particular manner, such that the instructions when stored in the computer readable storage medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method of tracking technologies in a technology tracking system including a hardware processor coupled to electronic hardware memory, the method comprising:
   providing a taxonomy in the electronic hardware memory wherein the taxonomy includes a plurality of software application names and a plurality of capability terms associated with the software application names, wherein for each of the capability terms, the respective capability term is associated with at least a respective one of the software application names;
   performing a first search of a data source by the hardware processor using the plurality of software application names and the plurality of capability terms from the taxonomy in electronic hardware memory, wherein the data source is a first data source;
   retrieving at the hardware processor a first plurality of text segments from the data source responsive to performing the first search of the data source, wherein each of the text segments includes at least one of the software application names or at least one of the capability terms from the taxonomy in electronic hardware memory;
   identifying at the hardware processor at least one new software application name or at least one new capability term from the first plurality of text segments retrieved from the data source responsive to performing the first search;
   determining at the hardware processor a respective use frequency for each of the at least one new software application name or for each of the at least one new capability term, wherein determining the respective use frequency for each of the at least one new software application name or for each of the at least one new capability term comprises searching a second data source for a number of instances of each of the at least one new software application name or for each of the at least one new capability term, and wherein the second data source is different than the first data source;
   responsive to a respective use frequency for a first one of the at least one new software application name or the at least one new capability term being greater than a use frequency threshold, updating the taxonomy in electronic hardware memory to include the first one of the at least one new software application name or the at least one new capability term having the respective use frequency that is greater than the use frequency threshold;
   responsive to a respective first use frequency of a second one of the at least one new software application name or the at least one new capability term being less than the use frequency threshold, updating a fringe list in electronic hardware memory to include the second one of the new software application name or the new capability term having the respective first use frequency that is less than the use frequency threshold, wherein the second one of the new software application name or the new capability term is preserved in the fringe list after performing the first search;
   after performing the first search, and after updating the taxonomy and updating the fringe list in electronic hardware memory, performing a second search of the data source using the hardware processor using the software application names and the capability terms from the taxonomy in electronic hardware memory;
   retrieving at the hardware processor a second plurality of text segments from the data source responsive to performing the second search of the data source after updating, wherein each of the text segments of the second plurality includes at least one of the software application names or at least one of the capability terms from the taxonomy in electronic hardware memory; and after updating the fringe list to include the second new software application name or the second new capability term, and after performing the second search, automatically removing the second new software application name or the second new capability term from the fringe list responsive to a second use frequency for the second new software application name or the second new capability term that is less than the use frequency threshold, wherein the second use frequency for the second new software application name or the second new capability term is determined subsequent to performing the second search.

2. The method of claim 1 wherein the at least one new software application name comprises a first plurality of new software application names or wherein the at least one new capability term comprises a first plurality of new capability terms, the method further comprising:

responsive to a respective use frequency of a third one of the at least one new software application name or the at least one new capability term being less than the use frequency threshold, updating a fringe list in electronic hardware memory to include the third one of the new software application name or the third new capability term having the respective use frequency that is less than the use frequency threshold;

identifying at the hardware processor a second plurality of new software application names or a second plurality of new capability terms from the second plurality of text segments retrieved from the data source responsive to performing the second search;

determining at the hardware processor a respective use frequency for each of the new software application names of the second plurality or for each of the new capability terms of the second plurality;

determining at the hardware processor a respective use frequency for the third new software application name or the third new capability term from the fringe list; and responsive to one of the new software application name of the second plurality or one of the new the new capability terms of the second plurality or the third software application name or the third new capability term from the fringe list having a use frequency exceeding the use frequency threshold, updating the taxonomy in electronic hardware memory to include the new software application name or the new capability term from the second plurality having a use frequency exceeding the use frequency threshold or to include the third new software application name or the third new capability term having a use frequency exceeding the use frequency threshold.

3. The method of claim 2, wherein updating the taxonomy in electronic hardware memory to include the new software application name or the capability term exceeding the use frequency threshold comprises:

responsive to one of the third new software application name from the fringe list or the third new capability term from the fringe list having a use frequency exceeding the use frequency threshold, updating the taxonomy in electronic hardware memory to include the third new software application name from the fringe list having a use frequency exceeding the use frequency threshold or the third new capability term from the fringe list having a use frequency exceeding the use frequency threshold.

4. The method of claim 1 wherein the data source comprises the world wide web.

5. The method of claim 1 wherein for each of the text segments, retrieving the text segment includes retrieving the text segment including a plurality of words before and after the respective software application name or capability term.

6. The method of claim 1 wherein for each of the text segments, retrieving the text segment includes retrieving a sentence including the respective software application name or capability term.

7. The method of claim 1 wherein at least one of the capability terms is associated with each of the software application names.

8. The method of claim 1 wherein each of the capability terms is associated with at least one of the software application names.

9. The method of claim 1,
wherein retrieving comprises retrieving at the hardware processor a first plurality of text segments from the data source, wherein each of the text segments includes at least one of the capability terms from the taxonomy in electronic memory so that the capability terms from the taxonomy are used to retrieve the plurality of text segments,
wherein identifying comprises identifying at the hardware processor at least one new software application name from the first plurality of text segments including the capability terms retrieved from the data source so that the capability terms from the taxonomy are used to identify the at least one new software application name,
wherein determining comprises determining at the hardware processor a respective use frequency for each of the at least one new software application name, and
wherein updating comprises responsive to a respective use frequency of one of the at least one new software application name being greater than the use frequency threshold, updating the taxonomy in electronic hardware memory to include the at least one new software application name having the respective use frequency that is greater than the use frequency threshold.

10. The method of claim 1,
wherein retrieving comprises retrieving at the hardware processor first and third pluralities of text segments from the data source responsive to performing the first search, wherein each of the text segments of the first plurality includes at least one of the software application names from the taxonomy in electronic memory so that the software application names from the taxonomy are used to retrieve the first plurality of text segments, and wherein each of the text segments of the third plurality includes at least one of the capability terms from the taxonomy in electronic memory so that the capability terms from the taxonomy are used to retrieve the third plurality of text segments,
wherein identifying comprises identifying at the hardware processor at least one new capability term from the first plurality of text segments so that the software application names from the taxonomy are used to identify the at least one new capability term, and identifying at the hardware processor at least one new software application name from the third plurality of text segments so that the capability terms from the taxonomy are used to identify the at least one new software application name, wherein determining comprises determining at the hardware processor a respective use frequency for each of the at least one new software application name and for each of the at least one new capability term, and wherein updating the taxonomy comprises updating the taxonomy in electronic hardware memory to include one of the at least one new software application name having a respective use frequency that is greater than the use frequency threshold and to include one of the at least one new capability term having a respective use frequency that is greater than the use frequency threshold.

11. The method of claim 10 wherein searching, retrieving, identifying, determining, and updating respectively comprise automatically searching without user intervention, automatically retrieving without user intervention, automatically identifying without user intervention, automatically determining without user intervention, and automatically updating without user intervention.

12. A technology tracking system comprising:
a network interface providing coupling over a network;
a hardware processor coupled to the network interface; and
electronic hardware memory coupled to the hardware processor wherein the electronic hardware memory provides a taxonomy including a plurality of software application names and a plurality of capability terms associated with the software application names, wherein for each of the capability terms, the respective capability term is associated with at least a respective one of the software application names, and wherein the electronic hardware memory comprises computer readable program code that when executed by the hardware processor causes the hardware processor to perform operations to,
perform a first search of a data source using the plurality of software application names and the plurality of capability terms from the taxonomy in the electronic hardware memory, wherein the data source is a first data source,
retrieve a first plurality of text segments from the data source responsive to performing the first search the data source, wherein each of the text segments includes at least one of the software application names or at least one of the capability terms from the taxonomy in the electronic hardware memory,
identify at least one new software application name or at least one new capability term from the first plurality of text segments retrieved from the data source responsive to performing the first search,
determine a respective use frequency for each of the at least one new software application name or for each of the at least one new capability term, wherein determining the respective use frequency for each of the at least one new software application name or for each of the at least one new capability term comprises searching a second data source for a number of instances of each of the at least one new software application name of for each of the at least one new capability term, and wherein the second data source is different than the first data source,
update the taxonomy in the electronic hardware memory to include at least a first one of the at least one new software application name having the respective use frequency that is greater than the use frequency threshold or to include a first one of the at least one new capability term having the respective use frequency that is greater than the use frequency threshold;
update a fringe list in the electronic hardware memory to include a second one of the at least one new software application name having a respective first use frequency that is less than the use frequency threshold or to include a second one of the at least one new capability term having a respective first use frequency that is less than the use frequency threshold, wherein the second one of the at least one new software application name or the second one of the at least one new capability term is preserved in the fringe list after performing the first search;
perform a second search of the data source using the software application names and the capability terms from the taxonomy in electronic hardware memory, after performing the first search, and after updating the taxonomy and updating the fringe list in electronic hardware memory;
retrieve a second plurality of text segments from the data source responsive to performing the second search of the data source after updating, wherein each of the text segments of the second plurality includes at least one of the software application names or at least one of the capability terms from the taxonomy in electronic hardware memory; and
automatically remove the second new software application name or the second new capability term from the fringe list after updating the fringe list to include the second new software application name or the second new capability term and after performing the second search responsive to a second use frequency for the second new software application name or the second new capability term that is less than the use frequency threshold wherein the second use frequency for the second new software application name or the second new capability term is determined subsequent to performing the second search.

13. The technology tracking system of claim 12 wherein the at least one new software application name comprises a first plurality of new software application names or wherein the at least one new capability term comprises a first plurality of new capability terms, wherein the electronic hardware memory further comprises computer readable program code that when executed by the hardware processor causes the hardware processor to perform operations to,
update a fringe list in the electronic hardware memory to include a third one of the at least one new software application name having a respective use frequency that is less than the use frequency threshold or to include a third one of the at least one new capability term having a respective use frequency that is less than the use frequency threshold;
identify a second plurality of new software application names or a second plurality of new capability terms from the second plurality of text segments retrieved from the data source responsive to performing the second search,
determine a respective use frequency for each of the new software application names of the second plurality or each of the new capability terms of the second plurality,
determine a respective use frequency for the third new software application name from the fringe list or for the third new capability term from the fringe list, and
update the taxonomy in electronic hardware memory to include one of the new software application names of the second plurality having a use frequency exceeding the use frequency threshold or one of the new capability terms of the second plurality having a use frequency exceeding the use frequency threshold or to include the third new software application name from the fringe list having a use frequency exceeding the use frequency threshold or the third new capability term from the fringe list having a use frequency exceeding the use frequency threshold.

14. The technology tracking system of claim 13, wherein updating the taxonomy in the electronic hardware memory to include the new software application name or the capability term exceeding the use frequency threshold comprises, responsive to one of the third new software application name from the fringe list or the third new capability term from the fringe list having a use frequency exceeding the use frequency threshold, updating the taxonomy in electronic hardware memory to include the third new software application name from the fringe list having a use frequency exceeding the use frequency threshold or the third new capability term from the fringe list having a use frequency exceeding the use frequency threshold.

15. The technology tracking system of claim 12 wherein the data source comprises the world wide web.

16. The technology tracking system of claim 12 wherein for each of the text segments, retrieving the text segment includes retrieving the text segment including a plurality of words before and after the respective software application name or capability term.

17. The technology tracking system of claim 12 wherein for each of the text segments, retrieving the text segment includes retrieving a sentence including the respective software application name or capability term.

18. The technology tracking system of claim 12 wherein at least one of the capability terms is associated with each of the software application names.

19. The technology tracking system of claim 12 wherein each of the capability terms is associated with at least one of the software application names.

20. The technology tracking system of claim 12,
wherein retrieving comprises retrieving a first plurality of text segments from the data source, wherein each of the text segments includes at least one of the capability terms from the taxonomy in electronic memory so that the capability terms from the taxonomy are used to retrieve the plurality of text segments,
wherein identifying comprises identifying at least one new software application name from the first plurality of text segments including the capability terms retrieved from the data source so that the capability terms from the taxonomy are used to identify the at least one new software application name,
wherein determining comprises determining a respective use frequency for each of the at least one new software application name, and
wherein updating comprises responsive to a respective use frequency of one of the at least one new software application name being greater than the use frequency threshold, updating the taxonomy in electronic hardware memory to include the at least one new software application name having the respective use frequency that is greater than the use frequency threshold.

21. The technology tracking system of claim 12,
wherein retrieving comprises retrieving first and third pluralities of text segments from the data source responsive to performing the first search, wherein each of the text segments of the first plurality includes at least one of the software application names from the taxonomy in electronic memory so that the software application names from the taxonomy are used to retrieve the first plurality of text segments, and wherein each of the text segments of the third plurality includes at least one of the capability terms from the taxonomy in electronic memory so that the capability terms from the taxonomy are used to retrieve the third plurality of text segments,
wherein identifying comprises identifying at least one new capability term from the first plurality of text segments so that the software application names from the taxonomy are used to identify the at least one new capability term, and identifying at the hardware processor at least one new software application name from the third plurality of text segments so that the capability terms from the taxonomy are used to identify the at least one new software application name,
wherein determining comprises determining a respective use frequency for each of the at least one new software application name and for each of the at least one new capability term, and
wherein updating the taxonomy comprises updating the taxonomy in electronic hardware memory to include one of the at least one new software application name having a respective use frequency that is greater than the use frequency threshold and to include one of the at least one new capability term having a respective use frequency that is greater than the use frequency threshold.

22. The technology tracking system of claim 21 wherein searching, retrieving, identifying, determining, and updating respectively comprise automatically searching without user intervention, automatically retrieving without user intervention, automatically identifying without user intervention, automatically determining without user intervention, and automatically updating without user intervention.

* * * * *